Patented Oct. 10, 1939

2,175,371

UNITED STATES PATENT OFFICE 2,175,371

META - HALO-p-ETHOXY - ACETOACET ANILIDES AND METHOD OF MANUFACTURING THE SAME

Frithjof Zwilgmeyer, Arden, Del., assignor to E. I. du Pont de Nemours & Company, Wilmington, Del., a corporation of Delaware No Drawing. Application July 17, 1937, Serial No. 154,202

5 Claims. (Cl. 260—562)

This invention relates to azo dyestuffs, and especially to new compounds which can be coupled to diazotized amines to form insoluble colored substances.

A new compound has been found which gives dyeings of exceptionally good properties, particularly fastness to washing when it is used as the coupling component in compositions containing diazoimino compounds, antidiazotates and the like, and is then developed.

It is among the objects of this invention to provide new intermediates for azo dyestuffs, particularly a new intermediate which is non-substantive to cotton and regenerated cellulose, and can be coupled to diazotized amines to form insoluble colored compounds. Another object is to provide dyes having exceptionally good fastness to the exposures encountered by textile fabrics and fibres. Another object of the invention is to provide a new azo dye coupling component which is non-substantive and is particularly useful in compositions containing diazoimino compounds for making printing pastes which are afterwards developed by acidification. Other objects of the invention will be apparent from the following description.

The objects of the invention are attained generally by reacting a 3-halogeno-4-ethoxy-aniline, such as 3-chlor-4-ethoxy-aniline and an alkyl-acyl-acetate, such as ethyl-aceto-acetate together in a non-aqueous non-reactive medium in which both reactants are soluble and which has a high boiling point. Reaction media having boiling points of about 130° C. give good results and those having somewhat higher boiling points, say about 150° C. are preferred, such as xylene, mixed xylenes and mixtures of xylenes and pyridine. The mixture is heated until condensation is attained and then cooled. The compound is then separated from the reaction medium by appropriate means.

The invention will be more fully understood from the following description and from the example which illustrates but does not limit the invention thereto.

Example 17 parts of 2-chlor-4-amino-phenetol obtained from ortho-dichlor-benzene by hydrolysis, nitration, ethylation and reduction, and having a melting point of 65° C., were added during 15 minutes to a reaction medium containing 30 parts of xylene, 14.3 parts of ethyl-aceto-acetate and 2.0 parts of pyridine at a temperature of 148° C. to 150° C. The mixture was kept at 148° to 150° C. for an additional 10 minutes after all the base had been added. The alcohol formed during the condensation was permitted to distill off. The reaction mixture was cooled to 10° C. and filtered. The cake was washed with 5 parts of cold alcohol and dried. 22 parts of 3-chlor-4-ethoxy-aceto-acetanilide were obtained. The compound had a melting point of 111° C. and is represented by the formula

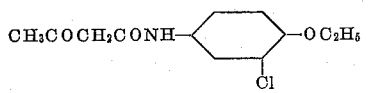

Instead of the ethyl ester of aceto-acetic acid, other alkyl esters of the acid can be used to make the compounds of the invention, such as methyl-, propyl-, butyl- and even longer chain alkyls. Satisfactory results are obtained with reaction mixtures which boil at about 150° C. but higher and lower boiling point mixtures can be used.

In the form of the invention which involves the dyeing of a cloth by the so-called process of printing, the azo component, diazotized and stabilized in the well known manner, is mixed in a basic paste with the second component, and the paste is applied to an etched or "printing" roller which impregnates the fabric by contact. The fabric may then be placed in a closed container to be subjected for a few seconds at elevated temperature to the action of the fumes of an acid, usually in the presence of water vapor. The acid used may conveniently be acetic acid. The acid neutralizes the basicity of the paste, the complex is broken up, the first component is freed, and reacts with the coupling component.

A printing paste was made by mixing 2 parts of 3-chlor-4-ethoxy-aceto-acet-anilide obtained as described in Example, 2 parts of the diazoimino compound obtained from diazotized 2,5-dimethoxy aniline and diethanolamine, 28 parts of water, 3 parts of sodium hydroxide 30% solution, and 65 parts of starch tragacanth thickener of the following composition.

The thickener consisted of 80 parts wheat starch, 360 parts gum tragacanth 6% solution, and 560 parts water.

Cotton and rayon piece goods were printed from an engraved roll with the above paste, the prints dried in the air, and then subjected to the action of live steam containing the vapors of acetic acid in accordance with the methods of printing hereinbefore described.

A color development took place and the printed goods was rinsed with water, boiled for 5 minutes in a 0.5% soap solution, again rinsed, and dried. A bright reddish yellow dyeing of good washing fastness properties was obtained. The new color had the probable formula:

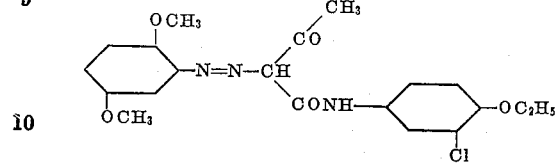

A variety of water soluble diazo imino derivatives can be used instead of those obtained from the diazotized amine and diethanolamine, among which is mentioned the diazo imino compounds obtained from piperidine carboxylic acid and those from methyl glucamine; but still other compounds can be used for stabilization. The coupling component can be used similarly in alkaline pastes with anti-diazotates. Textile fibres may also be impregnated with the coupling component and the color developed by applying diazo solutions to the impregnated material. Pigments may also be formed by mixing solutions of the coupling components and diazo solutions. However, in dyeing textiles it is preferred generally to develop the color by way of the use of printing pastes.

In dyeing a large number of non-substantive, n-auxochrome-substituted compounds, as well as those which are unsubstituted can be used as the azo components. The n-auxochromes are, specifically the groups alkyl, alkoxy, halogen, aryloxy, aralkyl, aralkoxy, aryl, hydroaryloxy and trifluoro-alkyl. In general, satisfactory results can be obtained by the substitution in the aryl nucleus of from one to three of these substituents, but more can be used. As examples of the large number of compounds which can be used as the azo components, when diazotized, the following are mentioned: 2-methoxy-naphthylamine; 2-methoxy-aniline; 2-phenoxy-aniline; 2-ethoxy-aniline; 2-chlor-5-methyl-aniline; 2-methyl-aniline; 2-methoxy-5-methyl-aniline; 2-methoxy-4-chlor-5-methyl-aniline; 2,5-dimethoxy-aniline; 2,5-diethoxy-aniline; 2,5-dimethoxy-4-chlor-aniline; 5-brom-2-methoxy-aniline; 3-iodo-6-methoxy-aniline; 3-iodo-6-ethoxy-aniline; 3-methyl-4-chlor-aniline; 3-brom-6-ethoxy-aniline; 3-chlor-6-ethoxy-aniline; 3-ethoxy-aniline; 3-phenoxy-aniline; 3-methoxy-aniline; 3-brom-6-phenoxy-aniline; 3-iodo-6-phenoxy-aniline; 3-brom-6-methyl-aniline; 3-chlor-6-methyl-aniline; 3-methyl-aniline; 3-brom-5-methyl-aniline; 3-chlor-6-phenoxy-aniline; 2,5-dimethyl-4-chlor-aniline; 4-ethyl-aniline; 4-benzo-trifluor-aniline; 4-chlor-2-methoxy-aniline; 4-brom-2-methoxy-aniline; 4-brom-2-ethoxy-aniline; 4-iodo-2-methoxy-aniline; 4-methoxy-aniline; 4-chlor-2-ethoxy-aniline; 4-phenoxy-aniline; 4-ethoxy-aniline; 4-brom-2-phenoxy-aniline; 4-methoxy-2-chlor-aniline; 4-chlor-2-methyl-aniline; 4-methyl-3-brom-aniline; 4-brom-3-methyl-aniline; 4-methyl-3-chlor-aniline; 4-methyl-aniline; 4-chlor-2,5-dimethoxy-aniline; 4-chlor-2-phenoxy-aniline; 4-methoxy-3-chlor-aniline; 4-phenoxy-2-chlor-aniline; 4-chlor-2,5-diethoxy-aniline; 3-ethoxy-aniline; 3-methoxy-aniline; 3-methyl-aniline; 3-chlor-2-methyl-aniline; 3-chlor-2-methoxy-aniline; 2-ethoxy-aniline; 2-methoxy-aniline; 2-methyl-aniline; alpha-naphthylamine; beta-naphthylamine.

The benzene radical of the coupling component can be substituted by any of the halogens instead of chloro. While the aceto-acet-3-chlor-4-ethoxy anilides are preferred, the benzo-acet- or furo-acet- derivatives can be used instead of the aceto-acet-derivatives, as examples of which the following formulae are representative.

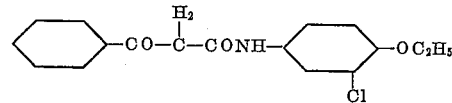

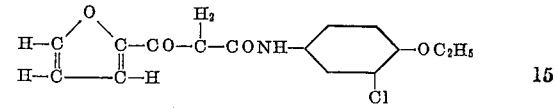

Since from the foregoing description of the invention it will be apparent to those skilled in the art that many embodiments of the invention may be made without departing from the spirit and scope thereof, it is to be understood that no limitations are intended in the annexed claims except those which are specifically recited or are imposed by the prior art.

I claim:

1. A compound represented by the formula

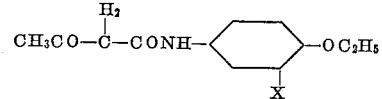

in which X is halogen.

2. The compound represented by the formula

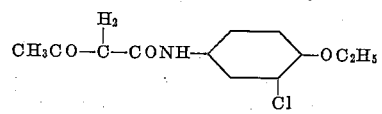

3. The process which comprises heating at about 150° C. a compound represented by the formula

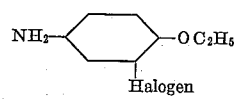

with an alkyl-aceto-acetate in a non-aqueous non-reactive high boiling point solvent for said compounds until an aceto-acetanilide is formed, whilst permitting the distillation of alcohol which is formed by said condensation, cooling and separating the condensation product from the reaction mixture.

4. The process which comprises heating at about 150° C. 2-chloro-4-amino-phenetol with an alkyl-aceto-acetate in a non-aqueous non-reactive high boiling point solvent for said compounds until aceto-acet-3-chlor-4-ethoxy aniline is formed, whilst permitting the distillation of alcohol which is formed during said condensation, coolng, and separating the condensaton product from the reaction mixture.

5. The process which comprises heating 2-chloro-4-amino-phenetol with an alkyl-aceto-acetate in a mixture containing about 30 parts xylene and about 3 parts pyridine at about 150° C. until aceto-acet-3-chlor-4-ethoxy aniline is formed, whilst permitting the distillation of alcohol which is formed during said condensation, cooling, and separating the condensation product from the reaction mixture.

FRITHJOF ZWILGMEYER.